3,553,605
PULSE RATE TO VOLTAGE ANALOG CONVERTER CIRCUIT FOR TRANSMISSION OF INTELLIGENCE MEASURED BY VOLTAGE
Gordon L. Brock and Charles H. Armstrong, Huntington Beach, Calif., assignors to Hersey-Sparling Meter Company, El Monte, Calif., a corporation of Massachusetts
Filed Apr. 17, 1968, Ser. No. 722,100
Int. Cl. H03k 7/06
U.S. Cl. 332—9
14 Claims

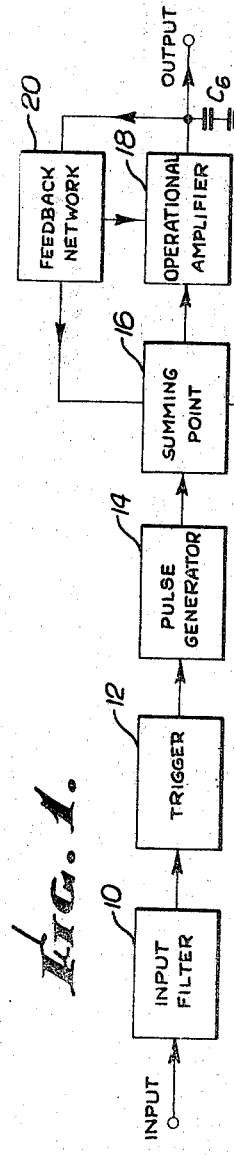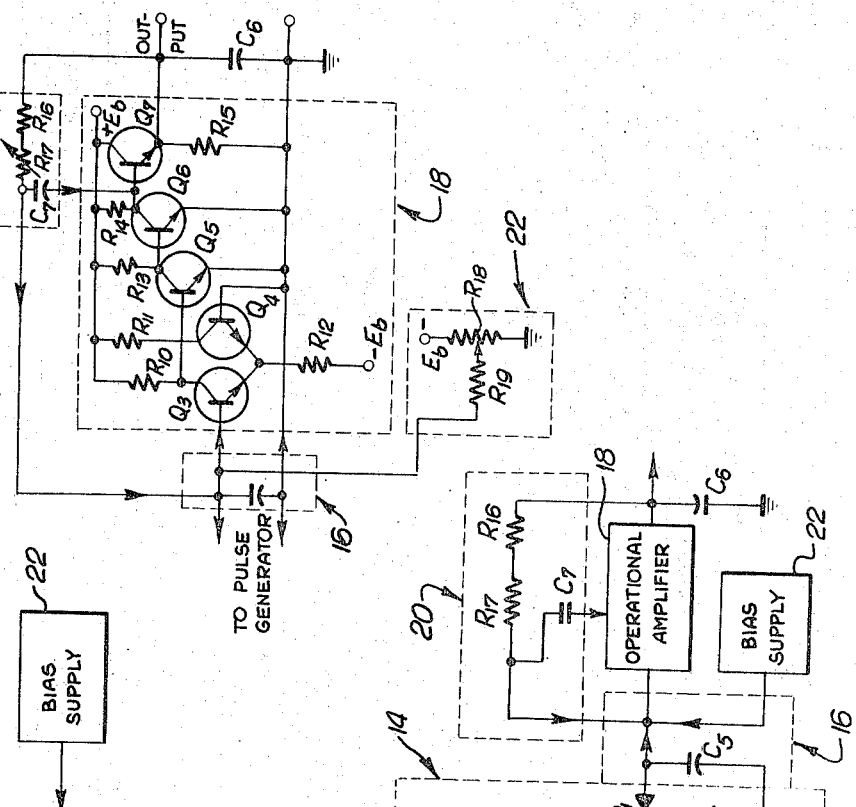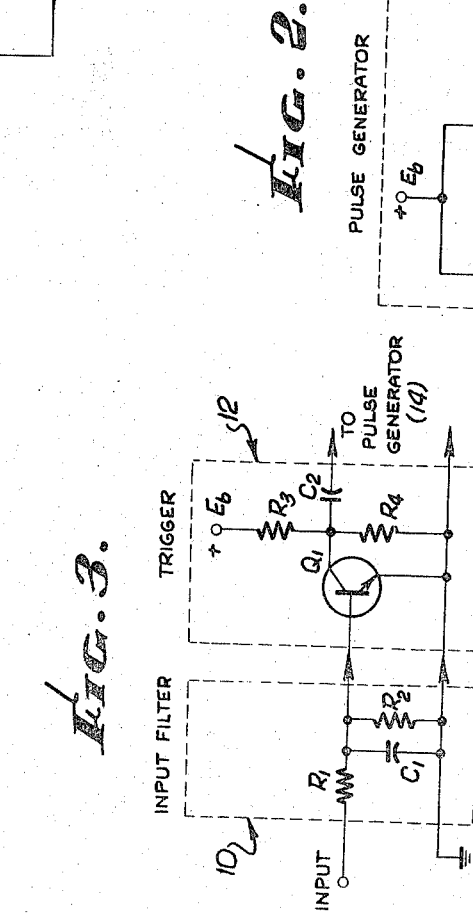

ABSTRACT OF THE DISCLOSURE

A circuit for developing a direct-current voltage analog of the repetition rate of an input pulse signal which may have a waveshape of irregular height and duration. Trigger pulses are generated in response to each input pulse and the trigger pulse in turn triggers a pulse generator which generates substantially uniform pulses of substantially constant height, duration and waveshape. The generated pulses are summed and averaged with respect to time to produce an output of the circuit that is a voltage analog of the repetition rate of the input pulse signal and may be indicated by any conventional means.

BACKGROUND OF THE INVENTION

The present invention relates generally to electronic pulse rate to analog voltage converters and more particularly to a circuit for generating a direct current voltage analog of the repetition rate of an input pulse signal which has a generally square waveshape but which may have irregular height and duration.

In modern industrial methods, great use is made of suitable sensors or transducers to monitor various conditions existing in an industrial system. In many instances, the conditions or quantities to be monitored are separated from a control point by great physical distances and, instead of providing a meter at the sensor, it becomes desirable to display, as meter or instrument readings at a central location, the information derived about conditions existing at one or a number of remote locations.

To accomplish this, various techniques of telemetry are employed to transmit the sensed quantities or values from remote locations to the central location where these quantities or values are duplicated to provide meter or instrument readings. Currently, electrical signals corresponding to the various remote readings or indications are transmitted to the central location through a suitable medium, as wires or radio waves, depending upon various factors, such as, for example, the distances of the remote stations from the central station, or the mobility of the remote stations.

At the central location, electrical signals are converted into meter or instrument readings indicating the remotely sensed quantities or values.

A common problem with such telemetry systems is that a transmission medium can introduce changes in the electrical signals as they are transmitted so that the signals arriving at the central location no longer accurately represent the original reading. For example, the signals may become attenuated because of the impedance of long conductors.

A common method of reducing or eliminating the modifying effects of the transmission medium is to vary one or more parameters of the electrical signals which are not affected by the transmission medium. In such a system, the unaffected parameter is made to vary in accordance with the sensor output and the variations are then reconverted to indications of the original readings at the central location.

When the electrical signal transmitted is a pulse train or sinusoidal wave, an unaffected parameter of such signal which may be varied is the pulse rate or frequency of the wave. Either the frequency deviation from a carrier or base frequency corresponds to the remote sensor reading or the frequency itself corresponds to the reading.

Ordinarily, pulse rates or frequencies in the order of hundreds or thousands of cycles per second are employed because of the relative ease of design of electric and electronic circuits for these frequencies. However, in certain applications where the monitored condition changes relatively slowly, it is often desirable, from an economic standpoint, to use relatively low pulse rates and frequencies of the order of cycles, or tens of cycles, per second and to use relatively low grade transmission mediums which would not adequately transmit the higher pulse rates or frequencies.

However, in the past, it has been difficult to design electric or electronic circuitry which would provide an adequate analog indication of a relatively low pulse rate and changes in that rate. At such low pulse rates, variations in the waveshape of the input pulse often adversely affected the operation and stability of the circuits used to develop the voltage analog.

Accordingly, it becomes a general object of the invention to provide a circuit that can receive pulses of nonuniform strength and waveshape arriving at low frequencies and produce an output voltage having a known relation to the rate of receiving the incoming pulses.

It is also an object of the invention to provide a novel circuit for a converter of this character that accurately produces a voltage analog of an input pulse rate and is simple in design and reliable in operation.

SUMMARY OF THE INVENTION

To solve problems in utilizing the repetition rate in a pulse train at a relatively low rate as the varying parameter in a telemetry system, the present invention provides an improved pulse rate to voltage analog converter. To eliminate the effects of varying the waveshape of the input pulse signal, the converter utilizes a triggered pulse generator which generates pulses of substantially constant height, duration and waveshape. The generated uniform pulses are continuously summed and averaged over time and the average is proportional to the number of generated uniform pulses which is in turn, controlled by the repetition rate of the input pulse train. The summed average of the generated uniform pulses serves as the input to an operational amplifier and the output of the amplifier is a voltage analog of the repetition rate of the input pulse train.

A pulse generator circuit is utilized to supply uniform pulses to the relatively low impedance input to the summing point and operational amplifier. The pulse generating circuit employs the relatively stable discharge and negative resistance characteristics of the emitter circuit of a unijunction transistor to discharge a capacitor-resistor network to supply a substantially uniformly shaped pulse of relatively short duration to the summing point and operational amplifier.

BRIEF DESCRIPTION OF THE DRAWING

FIG. 1 is a block diagram of the pulse rate to analog voltage converter embodying the present invention;

FIG. 2 is a partial block diagram of the converter with the pulse generator shown in schematic diagram form;

FIG. 3 is a schematic diagram of the input filter and trigger of the converter; and FIG. 4 is a schematic diagram of the summing point and operational amplifier of the converter.

DESCRIPTION OF A PREFERRED EMBODIMENT

Referring now to the drawing, the preferred embodiment of the converter shown has an input filter 10 for filtering out any high frequency components of the input pulse train and a trigger 12 which generates a trigger pulse for each input pulse. Each trigger pulse triggers a pulse generator 14 which generates uniform pulses of substantially constant height, duration and waveshape which are independent of the particular waveforms of the trigger pulses. The generated uniform pulses are summed and averaged with respect to time at a summing point 16 and the result serves as the input to an operational amplifier 18. The output of the operational amplifier 18 is also fed back to the summing point 16 through a feedback network 20. The output of the operational amplifier 18 for various input pulse repetition rates may be adjusted by varying the feedback network 20. A bias supply 22, connected to the summing point 16, may be adjusted to maintain the output at zero when there are no input pulses.

The particular embodiment shown is designed to be used with input pulse signals with generally square waveshapes but which may be of irregular height and duration. The repetition rate of the pulses preferably varies from zero to approximately twenty pulses per second and is the controlled parameter in the overall telemetry system. The pulse voltage in a typical installation varies from approximately 4 to 50 volts, but this range is not limitative on the invention.

Referring to FIG. 3, the input filter 10 is a resistor-capacitor low-pass configuration. Resistors $R_1$ and $R_2$ are connected in series as a voltage divider to reduce the input voltage level and isolate the input signal. Capacitor $C_1$ serves to filter out any high frequency components of the input signal. Typical values for the components of the input filter 10 are:

$R_1$—10K
$R_3$—2.2K
$C_1$—5 mfd. (25 wv.)

The reduced and filter input pulse signal then passes to the trigger circuit 12 which is mainly a transistor $Q_1$ which saturates for each input pulse. The collector of $Q_1$ is biased through the voltage divider network of resistors $R_3$ and $R_4$ connected to a source of direct current potential $E_b$ of 20 volts. Due to transistor $Q_1$ saturating, the collector voltage is reduced to practically zero for each input pulse. The resultant negative going pulse is communicated to the pulse generator 14 through capacitor $C_2$.

Typical values of components in the trigger 12 are:

$Q_1$—2N3565
$R_3$—10K
$R_4$—10K
$C_2$—1 mfd. (50 wv.)

The trigger pulses are communicated to the pulse generator 14 which generates a pulse of substantially constant height, duration and waveshape in response to each trigger pulse. In general, the pulse generator has a substantially monostable operation in that, in the absence of a trigger pulse, no uniform pulse is generated at 14. The trigger pulse from 12 starts the operation of the pulse generator which is then substantially independent of the trigger pulse. Once the uniform pulse has been generated, the pulse generator returns to its quiescent stable state until the next trigger pulse arrives.

Because the generated uniform pulses are to be summed and averaged in a relatively low impedance summing point 16 which is also the input to the operational amplifier 18, it is desirable that the pulse generator 14 also be of low impedance. To this end, advantageous use is made of the relatively stable negative resistance emitter characteristics of a unijunction transistor $Q_2$. As is well known, the emitter to base 2 circuit of a unijunction transistor such as $Q_2$ provides a "threshold" effect and when the emitter voltage reaches the threshold or peak point, the unijunction "fires" and the emitter impedance appears to be quite low to external circuit elements due to the negative resistance characteristic of $Q_2$. It is also known that, after firing, when the emitter voltage is lowered to a "valley point," the emitter impedance practically instantaneously returns to its relatively high initial value. These emitter characteristics are also relatively stable for voltage and temperature variations when compared to other semiconductor devices.

In the pulse generator 14 of the present invention, the above discussed phenomenon is used to advantage by connecting the emitter circuit of the unijunction transistor $Q_2$ through a capacitor-resistor network, to the low impedance summing point 16 and input to the operational amplifier 18. The unijunction transistor $Q_2$ is then selectively fired in response to the trigger pulses and the discharge of the resistor capacitor network through the emitter circuit of the unijunction transistor $Q_2$ and the summing point 16 generates uniform pulses, the height duration and waveshape of which remain substantially constant from pulse to pulse. This is due to both the practical isolation of the emitter circuit from the trigger 12 and the relative stability of the emitter circuit. The effect of the uniform pulses on the summing point 16 and the input to the operational amplifier 18 is then highly predictable. The effect of a number of such pulses summed and averaged over time is also highly predictable and serves as a basis for the voltage analog representation of the number of pulses generated at 14 per unit of time.

More particularly, referring to FIG. 2, the pulse generator 14 of the present invention employs a unijunction transistor $Q_2$ with its base 1 (24) to base 2 (26) bias voltage derived from a source of direct current potential $E_b$ and a series resistor $R_5$. The emitter of $Q_2$ is biased at a potential slightly less than the peak point or threshold voltage for the particular base-to-base voltage used. The emitter bias potential is derived from the direct current source $E_b$ through the series-resistance voltage divider network consisting of resistors $R_6$ and $R_7$, thus $Q_2$ is stable in its quiescent state.

A capacitor $C_3$ is connected between the emitter of $Q_2$ and the common circuit point. Another capacitor $C_4$ is also connected from the emitter of $Q_2$ through a resistor $R_8$ to the common circuit point. The junction point of $C_4$ and $R_8$ is connected through a diode $D_1$ to the summing point 16.

The negative going trigger pulses pass through $C_2$ to base 1 (24) of $Q_2$. The negative trigger pulse instantaneously lowers the base-to-base voltage of $Q_2$ so that the emitter voltage is above the peak point or threshold and $Q_2$ fires. It is to be noted that once the emitter through base 2 (26) circuit of $Q_2$ fires, the presence or absence of the trigger pulse does not affect the subsequent operation of the pulse generator 14.

When $Q_2$ fires, the impedance of the emitter circuit drops to a low value and $C_3$ rapidly discharges through that low impedance. The low impedance of the emitter circuit $Q_2$ also affords a discharge path for $C_4$ which, in discharging, charges capacitor $C_5$ across the summing point 16 through diode $D_1$. It is to be noted that the discharge of capacitor $C_3$ and capacitor $C_4$ occurs very rapidly and the resultant pulse is relatively short duration but has a substantially uniform waveshape. When the emitter voltage is lowered to the valley point, the emitter impedance resumes its initial value which is practically an open circuit. At this point, capacitors $C_3$ and $C_4$ begin to recharge toward their initial conditions with time constants determined by the values of $C_3$, $C_4$, $R_6$, $R_7$, and $R_8$.

When the recharging of capacitors $C_3$ and $C_4$ begins, diode $D_1$ effectively isolates the pulse generator 14 from the summing point 16 because the recharging current cannot flow through diode $D_1$ to the summing point 16. The pulse generator 14 then returns to its initial condition to await the arrival of the next trigger pulse.

The charging current through capacitor $C_5$ develops a voltage across that capacitor which serves as the input to the operational amplifier 18, of any suitable known circuit. It will be appreciated that because capacitor $C_5$ is between the summing point 16 and the common circuit point, the feedback from the output of the operational amplifier 18 through the feedback network 20 will tend to discharge capacitor $C_5$ to maintain the input to the operational amplifier 18 at practically zero potential as in well known operational amplifier operation. Thus, successive charging pulses from pulse generator 14 are effectively summed and averaged over time. The averaged sum of the charging pulses from the pulse generator 14 is proportional to the pulse rate and, therefore, the output of the operational amplifier 18 is a substantially linear voltage analog of that pulse rate.

Typical component values for the components of the pulse generator 14 and $C_5$ are as follows:

$Q_2$—2N2646 (General Electric)
$C_3$—.1 mfd. (100 wv.)
$C_4$—.1 mfd. (100 wv.)
$C_5$—10 mfd. (25 wv.)
$R_5$—750 ohms
$R_6$—10K
$R_7$—12K
$R_8$—2.2K
$D_1$—(1N914)

The operational amplifier 18 employed in the converter may be a well known type and has a pair of transistors $Q_3$ and $Q_4$ connected in a paraphrase amplifier configuration. Resistors $R_{10}$ and $R_{11}$ serve as the collector resistors for transistors $Q_3$ and $Q_4$, respectively, and $R_{12}$ serves as a common emitter resistor connected to a souce of voltage equal to $E_b$ but of opposite polarity. Resistors $R_{13}$ and $R_{14}$ serve as the collector resistors of transistors $Q_5$ and $Q_6$, respectively, and $R_{15}$ serves as the emitter resistor of $Q_7$.

Typical values or types for the components of the operational amplifier are as follows:

$Q_3$ and $Q_4$—2N3565 (matched pair)
$Q_5$—2N3565
$Q_6$—2N3565
$Q_7$—2N3565
$R_{10}$—150K
$R_{11}$—82K
$R_{12}$—150K
$R_{13}$—82K
$R_{14}$—10K
$R_{15}$—10K Capacitor $C_6$ is connected across the output of the operational amplifier 18 to aid in smoothing the output signal and a typical value for this capacitor is 100 mfd. at 25 wv.

The feedback network 20 connected between the output of the operational amplifier 18 and the summing point 16 is a pair of resistors $R_{16}$ and $R_{17}$ connected in series, with $R_{17}$ being variable to adjust the amount of feedback. A capacitor $C_7$ is connected between the summing point side of the feedback network and the collector of $Q_6$ in the operational amplifier. $C_7$ serves to smooth out the feedback signal.

Typical values for the components of the feedback circuits are:

$R_{16}$—430K
$R_{17}$—100K (potentiometer)
$C_7$—4.7 mfd. (35 wv.)

To aid in adjusting the output of the operational amplifier 18 so that it reads zero when there are no input pulses, a bias supply 22 is also connected to the summing point 16. The potential for the bias supply 22 can be most conveniently derived from the voltage source $E_b$. The bias supply 22 is a potentiometer $R_{18}$ connected across $E_b$ with resistor $R_{19}$ between the tap of the potentiometer and the summing point 16.

Typical values for the components of the bias network are:

$R_{18}$—100K (potentiometer)
$R_{19}$—10 meg-ohm

It will be understood that while a particular preferred embodiment of the invention has been described and illustrated, modifications of design and construction can be made without departing from the spirit and scope of the invention. Therefore, the above description is considered to be illustrative of, rather than limitative upon, the invention as defined in the appended claims.

We claim:
1. An electrical circuit for generating a voltage analog of the pulse repetition rate of an input pulse signal, comprising:
   trigger means for generating a trigger pulse for each input pulse;
   pulse generator means coupled to said trigger means for generating a single train of pulses that are substantially uniform as to amplitude and width, each uniform pulse being generated in response to one trigger pulse and at the same frequency as the trigger pulses; and
   summing and averaging means coupled to said pulse generating means for summing and averaging over time said substantially uniform pulses to develop said voltage analog.

2. The electrical circuit of claim 1 wherein said summing and averaging means include operational amplifier means.

3. The electrical circuit of claim 2 wherein said operational amplifier means includes:
   an operational amplifier;
   an electrical circuit means connected to said operational amplifier whereby said uniform pulses are summed and averaged over time to develop said voltage analog.

4. The electrical circuit of claim 1 wherein said pulse generating means includes monostable circuit means responsive to said trigger pulses to generate said uniform pulses.

5. The electrical circuit of claim 4 wherein said monostable circuit means include:
   electrical control means having the characteristics of a unijunction transistor;
   and electrical circuit means for connecting said control means in a monostable circuit configuration.

6. The electrical circuit of claim 5 wherein:
   said electrical control means is a unijunction transistor having first and second bases and an emitter, said first base being coupled to said trigger means, and said second base being connected to a common circuit point;
   and said electrical circuit means for connecting said control means in a monostable circuit configuration is connected to said emitter of said unijunction transistor.

7. The electrical circuit of claim 1 wherein said pulse generating means includes:
   monostable circuit means responsive to said trigger pulses to generate said uniform pulses;
   and said summing and averaging means includes operational amplifier means, the output of said monostable circuit means being coupled to the input of said operational amplifier means.

8. The electrical circuit of claim 7 wherein:
   said monostable circuit means include electrical control means having the characteristics of a unijunction transistor and electrical circuit means for connecting said control means in a monostable circuit configuration;

and said operational amplifier means include an operational amplifier with the output of said monostable circuit means being connected to the summing point of said operational amplifier through a unidirectional current-conducting device, said operational amplifier means further including electrical circuit means connected to the summing point and output terminal of said operational amplifier whereby the portion of said output of said monostable circuit means arriving at the summing point through said unidirectional current-conducting device is summed and averaged over time.

9. A pulse repetition rate to analog voltage converter circuit comprising:

input means for receiving an input signal having only a single series of pulses of irregular waveshape;

trigger means coupled to said input means for generating pulses for each input pulse;

pulse generator means coupled to said trigger means for generating a single train of pulses that are substantially uniform as to amplitude and width with respect to the input pulses, said uniform pulses being generated in response to the time frequency of said input pulses and said trigger pulses;

operational amplifier means with the input thereof coupled to the said pulse generator means, said operational amplifier means including electrical circuit means whereby said substantially uniform pulses are substantially summed and averaged over time to develop said voltage analog; and bias means for biasing the input of said operational amplifier means.

10. The circuit of claim 9 wherein the repetition rate of said input pulse signal varies from 0 to approximately 20 pulses per second.

11. The circuit of claim 9 wherein said pulse generator means include:

a unijunction transistor having first and second bases and an emitter, said first base being connected through a first resistor to a source of direct current energy, said first base being coupled to said trigger means, and said second base being connected to a common circuit point;

biasing means for biasing said emitter at an electrical potential substantially equal to but less than the threshold firing potential of said unijunction transistor;

a first capacitor connected between said emitter and the common circuit point;

a second capacitor and a second resistor connected in series between said emitter and the common circuit point, said second capacitor being connected to said emitter;

and a diode having one end connected to the junction of said second capacitor and said resistor connected in series, the other end of said diode being connected to the summing point of said operational amplifier means.

12. The circuit of claim 11 wherein said operational amplifier means include:

an operational amplifier;

a third capacitor connected between the summing point of said operational amplifier and the common circuit point;

a fourth capacitor connected between the output terminal of said operational amplifier and the common circuit point;

and a substantially resistive feedback network between the output terminal of said operational amplifier and the summing point.

13. The circuit of claim 12 wherein the repetition rate of said input pulse signal varies from 0 to approximately 20 pulses per second.

14. A pulse generator circuit comprising:

input means for receiving a trigger pulse signal having a pulse repetition rate which varies from 0 to approximately 20 pulses per second;

a unijunction transistor having first and second bases and an emitter, said first base being connected through a first resistor to a source of direct current energy, said first base being coupled to said input means, and said second base being connected to a common circuit point;

a series resistance voltage dividing network connected between a source of direct current energy and the common circuit point for biasing said emitter of said unijunction transistor at an electrical potential substantially equal to but less than the threshold firing potential of said unijunction transistor;

a first capacitor connected between said emitter and the common circuit point;

a second capacitor and a second resistor connected in series between said emitter and the common circuit point, said capacitor being connected to said emitter;

and a diode connected between the junction of said second capacitor and second resistor and an output terminal for said pulse generating circuit.

References Cited
UNITED STATES PATENTS

| | | | |
|---|---|---|---|
| 2,940,052 | 6/1960 | Van Winkle | 328—140X |
| 2,970,276 | 1/1961 | Dollinger | 330—9 |
| 3,087,156 | 4/1963 | D'Onofrio et al. | 330—9(UX) |
| 3,214,708 | 10/1965 | Chamberlain | 332—14 |
| 3,366,881 | 1/1968 | Malone et al. | 328—109X |

ALFRED L. BRODY, Primary Examiner

U.S. Cl. X.R.

307—233, 271, 283; 325—141; 328—140; 329—107; 332—14